Patented Apr. 6, 1954

2,674,321

UNITED STATES PATENT OFFICE 2,674,321

LOW WATER-LOSS CEMENT SLURRY

Howard G. Cutforth, Bartlesville, Okla., assignor to Phillips Petroleum Company, a corporation of Delaware No Drawing. Application December 19, 1949, Serial No. 133,948

16 Claims. (Cl. 166—22)

This invention relates to low water-loss cement slurries. In one specific aspect it relates to low water-loss cement slurries comprising hydraulic cement, such as Portland cement, with or without non-cementing inert granular aggregate material, which hydraulic cement may or may not contain the usual minor additives common to hydraulic cements such as calcium sulfate and/or calcium chloride as examples in amounts up to 3%, sufficient water to make a slurry, and a small but effective amount of a water-loss reducing additive soluble in said aqueous hydraulic cement slurry selected from the group consisting of acid sulfobenzyl lignin ether, acid sulfobenzyl lignin ethers in which one or more of the hydrogen atoms of the alpha CH₂ has been replaced by a methyl, ethyl, or normal or isopropyl radical, and salts of said ethers, ethers with alkylene groups of four carbon atoms or fewer being preferred, and the alkali metal, alkaline earth metal and ammonium salts of said ethers being preferred. There are only six alpha substituted sulfobenzyl lignin ethers, known as alpha-alkylsulfobenzyl lignin ethers, covered by the preceding sentence. They are:

Alpha-methylsulfobenzyl
Alpha-ethylsulfobenzyl
Alpha-n propylsulfobenzyl
Alpha-isopropylsulfobenzyl
Alpha-alpha-di-methylsulfobenzyl
Alpha-methyl-alpha-ethylsulfobenzyl The alkylene group referred to as having four or fewer carbon atoms includes whatever alkyl group, or groups, have been added to the alpha methylene portion of the sulfobenzyl along with said alpha methylene portion.

In the art of cementing oil wells and in grouting cracks in masonry structures there is a tendency for the cement slurry to lose water to such an extent that it becomes dehydrated, set, or cracked, prematurely, with the result that it cannot be properly placed in position due to an increase in viscosity of the slurry, and resulting increases in force necessary to pump or move the slurry into position. This deleterious dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated, as artificial contamination of oil sands with water will often cause shaley impurities in the sand to swell and reduce the permeability of said oil sand to a very great extent. Therefore, water lost from the slurry tends to seal off the formation to oil flow. When it is intended to cement with slurry, and then gun perforate the hardened slurry, the gun perforator may not be able to penetrate into the formation beyond the slurry to a sufficient depth to penetrate into the region beyond that in which the shaley impurities are swollen by the water extracted by the formation from the slurry. In such cases the oil production rate of the well may be severely reduced by water contamination from the slurry.

I have found that by adding a small but effective amount of a water-loss reducing additive soluble in said aqueous hydraulic cement slurry selected from the group consisting of acid sulfobenzyl lignin ether, acid sulfobenzyl lignin ethers in which one or more of the hydrogen atoms of the alpha CH₂ has been replaced by a methyl, ethyl, or normal or isopropyl radical, and salts of said ethers, ethers with alkylene groups of four carbon atoms or fewer being preferred, and the alkali metal, alkaline earth metal and ammonium salts of said ethers being preferred, said additive being added in the amount of 1% based on the weight of dry cement and preferably using ordinary commercial Portland cement containing the usual additives, along with sufficient water to make a slurry, that the water-loss as determined by filtration tests is reduced, and contamination of the formation with water is substantially prevented.

One object of the present invention is to provide an improved low water-loss cement slurry useful in grouting in general, in cementing the walls of wells, and for cementing pipe in wells.

Another object is to provide a low water-loss cement which will not contaminate the earth formations in bore holes with water to any substantial extent.

Another object is to provide a cement slurry suitable for use in oil well cementing operations.

Numerous other objects and advantages will be apparent upon reading the accompanying specification and claims.

In preparing the slurry the dry ingredients comprising hydraulic cement, with or without the usual additives, the inert filler material such as sand or crushed limestone, and a water-loss reducing additive soluble in said aqueous hydraulic cement slurry selected from the group consisting of acid sulfobenzyl lignin ether, acid sulfobenzyl lignin ethers in which one or more of the hydrogen atoms of the alpha CH₂ has been replaced by a methyl, ethyl, or normal or isopropyl radical, and salts of said ethers, ethers with alkylene groups of four carbon atoms or fewer being preferred, and the alkali metal, alkaline earth metal and ammonium salts of said ethers being preferred, may be mixed together and later mixed with water, or any of them may be mixed separately with water, and then mixed together to form the cement slurry, as long as the mixing of the hydraulic cement with water is done promptly before placing the slurry in position.

By hydraulic cement I intend to include all mixtures of lime, silica, and alumina, or of lime and magnesia, silica, and alumina and iron oxide (magnesia for example may replace part of the lime, and iron oxide a part of the alumina) as are commonly known as hydraulic cements. Hydraulic cements include hydraulic limes, grappier cements, puzzalan cements, natural cements, and Portland cements. Puzzalan cements include slag cements made from slaked lime and granulated blast furnace slag. Because of its superior strength Portland cement is preferred among the hydraulic cements but as the art of cements recognizes hydraulic cements as a definite class, and as results of value may be obtained with any member of that class, it is desired to claim all hydraulic cement.

In most oil well cementing and grouting operations it is generally desirable to use neat cement so the slurry will be easy to pump in place but obviously it is always possible to add any desired amount of an inert granular filling material or aggregate such as sand, ground limestone, or any of the other well known inert aggregates, as long as the amount added does not reduce the strength below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical, it being obvious that sufficient water should be added to form a pumpable slurry, and that when the slurry becomes pumpable very little additional water need be added. One advantage of the slurry of the present invention is that it is a low water-loss slurry, and therefore it is not necessary to add much excess water over the amount making the slurry pumpable as a reserve for expected losses, which would tend to reduce the strength of the cement.

In order to reduce the water loss of the cement slurry, I add a small but effective amount of a water-loss reducing additive soluble in said aqueous hydraulic cement slurry selected from the group consisting of acid sulfobenzyl lignin ether, acid sulfobenzyl lignin ethers in which one or more of the hydrogen atoms of the alpha CH2 has been replaced by a methyl, ethyl, or normal or isopropyl radical, and salts of said ethers, ethers with alkylene groups of four carbon atoms or fewer being preferred, and the alkali metal, alkaline earth metal and ammonium salts of said ethers being preferred, about 0.1% to 5% by weight of additive to the weight of the dry cement being preferred.

The structure of lignin is not definitely known. The authorities generally believe that it is a polymer of propyl guaiacol. The lignin molecule is believed to contain at least 1 phenolic hydroxyl group and probably four other hydroxyl groups, 3 of which are apparently of equal re-activity and are probably primary alcohol groups. The other, somewhat less reactive group, is probably a secondary alcohol.

For the purpose of illustrating the material with a formula, according to "High Polymers: Volume V; Cellulose and Cellulose Derivatives" by Emil Ott, Interscience Publishers, Inc. New York (1946), page 487 left side of Equation (1), lignin may be represented as:

$$\left( \begin{array}{c} H \quad O-H \\ | \quad | \\ R-C=C-R' \end{array} \right)_n$$

Lignin

In this R and R' are carbon-containing radicals, C is carbon, H hydrogen, O oxygen, and the whole group is repeated a number of times, represented by $n$, which may be 100 or more. Most of the OH radicals are unchanged, but enough of them are substituted (as will be explained below) to make the material water soluble. As degrees of substitution are difficult to determine, I have found that the degree of substitution rendering the material water soluble is a sufficient test for its utility. By water soluble, I mean that it appears to be water soluble to the eye, as whether it is a true solution or some sort of dispersion is not in question, the prior art referring to such materials as water soluble. The material is of value to the extent that it is water soluble, and border line substances may be used which are only partly or barely water soluble, but better results are obtained when the material is clearly water soluble. However, it need not be water soluble if it is soluble in the cement slurry, and all water soluble materials of this nature are also soluble in the aqueous cement slurry plus less substituted materials that are not quite water soluble, as the alkalinity of the cement aids in the solution. Also the alkalinity of the cement will convert the acid materials to alkali metal or alkaline earth metal salts. The sulfobenzyl or substituted sulfobenzyl radical replaces some of the hydrogen atoms in the —OH radicals of the lignin. All lignin residues are not substituted, and more than one radical is not necessarily attached to the same residue, but enough are attached to some residue of the same lignin molecule that the material is water soluble. The formula therefore for acid sulfobenzyl lignin and its salts is represented as follows, which is analogous to U. S. patent to Lea 2,562,148 of July 24, 1951 (filed July 11, 1949) column 3 lines 56 to 71 which shows the same reaction of the hydroxyl radical of a different high polymer which is somewhat similar to that in the first formula in the present paragraph, wherein M is a metal, or hydrogen, or some basic radical such as NH4, S is sulfur, and the other letters as explained above:

$$\left( \begin{array}{c} H \quad O-CH_2C_6H_4SO_3M \\ | \quad | \\ R-C=C-R' \end{array} \right)_n$$

One of both of the hydrogen atoms in the alpha CH2 group above may be substituted by a methyl, ethyl or normal or isopropyl radical, except that the number of carbon atoms in the alkylene group should not exceed 4.

While not the invention of the present applicant, sodium lignin benzyl sulfonate may be prepared in the manner described below. The other alkali metal salts, the alkaline earth metal and ammonium salts, and any other desired salt of sulfobenzyl lignin, as well as the acid sulfobenzyl lignin can be prepared in a manner similar to the sodium salt, as will be obvious to a chemist, or the sodium sulfobenzyl lignin can be converted into the acid sulfobenzyl lignin or its desired salt by well understood chemical reactions. Similarly acid sulfobenzyl lignin ethers and salts of the same in which one or more of the hydrogen atoms of alpha CH₂ has been replaced by a methyl, ethyl, or propyl radical, the ethers with alkyl groups of four carbon atoms or fewer being preferred, obviously can be prepared in the same manner because the methyl, ethyl or propyl radicals do not change the type of reaction by which the sodium sulfobenzyl lignin ether is formed. Another name for sodium sulfobenzyl lignin ether is sodium lignin benzyl sulfonate, the material being exactly the same.

While the exact formula for lignin is unknown, it is known to have a reactable hydroxyl group. This hydroxyl group, or groups, may be reacted first with sodium hydroxide, or other hydroxide, as follows, only one unit of the lignin being shown:

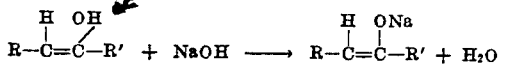

This sodium derivative of lignin is then reacted with sodium α-chlorotoluenesulfonate as follows:

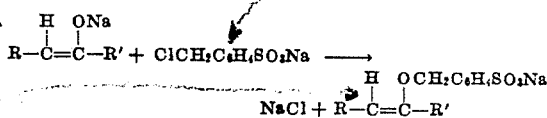

100 grams of "Indulin A" which is a trade-mark for lignin made from pine wood by the West Virginia Pulp and Paper Company, were slurried in 500 grams of water. To the agitated slurry a solution of 150 grams of sodium hydroxide dissolved in 250 grams of water was added.

The mixture was stirred in a one liter flask and heated to 131–149° F. To the resulting dark colored solution 75 grams of sodium α-chlorotoluenesulphonate were added. The mixture was stirred and heated for one hour; after which time the heating was stopped and material cooled to 122° F. and filtered. All the products were soluble, and a black solution resulted. About 250 cc. of water were used to rinse the flask and filter and added to the solution. Said black solution was concentrated slightly in a draft oven at 122° F. for sixteen hours.

The sodium sulfobenzyl lignin was then separated from said black solution by extraction by stirring in a Waring Blender with absolute ethanol and then filtering. This process was repeated several times, and the resulting finely divided black powder was further washed with absolute ethanol and ether. The final product was dried in a vacuum over "Drierite" a trade-mark name for calcium sulfate in the anhydrous or partially anhydrous state. As the Drierite does not enter into the chemical reaction but merely takes water out of the atmosphere over the same, calcium chloride or any other drying agent could just as well have been used in place of the "Drierite." If desired the sodium sulfobenzyl lignin can be further dried in a vacuum over P₂O₅ at 212° F.

The yield from the above described batch operation was 289.5 grams having a chemical analyses when tested of 22% sodium, 1.58 per cent chloride, 37.8 per cent sodium carbonate, and 3.56 per cent sulfur. This analysis indicates a product of 59.6 per cent sodium lignin benzyl sulfonate with a degree of substitution of 1.2 sulfobenzyl groups per lignin unit and 0.9 sodium per lignin unit.

This above described material was made in the same manner as that used in test No. 1 in the table in the present application, but due to minor unavoidable differences in the amounts and physical form of materials employed, and of course unavoidable and unknown minor errors in analysis, the analysis is not exactly the same, but is substantially the same.

The material used in test No. 3 of said table was made in the manner described in the following paragraph, but as explained in the paragraph above, while the resulting material is substantially the same the analysis is not exactly the same.

100 grams of lignin were slurried in an alcoholic (methanol) sodium hydroxide solution containing 150 grams of sodium hydroxide and 750 cc. of methanol. This mixture was heated to 122° F. for one hour before adding 150 grams of sodium α-chlorotoluenesulfonate. The mixture was heated at 122–129° F. and kneaded in a mixer for four hours. Most of the methanol was removed by vacuum. A hard, gummy, hygroscopic black product resulted. The product was chiseled from the reactor and broken with alcohol (Formula 30) in a blender. When filtered and washed with ether, a cocoa colored product resulted. The product was dried in vacuum over a drying agent; however, the product does not appear to be dry, and it is still very hygroscopic. The product is water and methanol soluble. The product was further washed with absolute ethanol in a blender until the washings were almost clear. A final wash with ether was made before drying the product in vacuum over the drying agent. Product 3727-65-1, yield 122.5 grams: analysis of the product, dried in vacuum over P₂O₅ at 212° F., was sodium 16.8 per cent; chloride 5.7 per cent; sodium carbonate 21.4 per cent; sulfur 4.2 per cent. These analyses indicate a product with 69.2 per cent sodium lignin benzyl sulfonate with a degree of substitution of 1.5 sulfobenzyl groups per lignin unit and 0.4 sodium per lignin unit.

I have found that from 0.1% to 5% of a water-loss reducing additive soluble in said aqueous hydraulic cement slurry selected from the group consisting of acid sulfobenzyl lignin ether, acid sulfobenzyl lignin ethers in which one or more of the hydrogen atoms of the alpha CH₂ has been replaced by a methyl, ethyl, or normal or isopropyl radical, and salts of said ethers, ethers with alkylene groups of four carbon atoms or fewer being preferred, and the alkali metal, alkaline earth metal and ammonium salts of said ethers being preferred are particularly effective in reducing the water loss of hydraulic cement aqueous slurries, with or without inert filling material present.

A Portland cement slurry was made up with water and Portland cement to weigh 16.3 pounds per gallon of slurry, and 1% of two different sodium sulfobenzyl lignin ethers by weight (based on the dry Portland cement) were added each to a separate portion of the sample. The three portions of the sample were tested separately according to the test procedure for drilling muds described in A. P. I. code 29 and the sample which had no additive lost 45 cc. of water in 0.3 minute through the standard filter paper at 100 p. s. i., whereas under the exact same conditions the second portion with the sodium sulfobenzyl lignin additive lost 20 cc. in 30 minutes and the third portion of the sample containing the sodium sulfobenzyl lignin ether only lost 12 cc. of water in 30 minutes. Obviously, the portion of the sample without the additive would lose water to the formation of a well to such an extent that it would dehydrate and have a premature setting, or bridging effect, which would increase the pressure needed to place the slurry to a degree making the operation inoperative in many wells having porous formations, and the water from the slurry would contaminate such formations, whereas the portions of the sample containing the additive would not give up water to such a formation, and would remain easily pumpable into place during continued exposure to such a formation.

In all of said tests the cement was stirred three minutes before the tests were conducted. The results in tabular form are:

*Table*

| Test | Type Cement | Lbs./gal. of slurry | Sulfobenzyl Lignin, percent | Age, min. | Temperature | W. L. cc./min. |
|---|---|---|---|---|---|---|
| 1 [1] | D. P. 12 | 16.3 | [2] 1 | 3 | Room | 12/30 |
| 2 | D. P. 12 | 16.3 | 0 | 3 | ---do--- | 45/0.3 |
| 3 | D. P. 12 | 16.3 | [3] 1 | 3 | ---do--- | 20/30 |

[1] Type D. P. 12 cement is a Type 1 common Portland cement used for cementing oil wells.
[2] Degree of substitution estimated about 1.2 sulfobenzyl groups and 0.9 sodium per building unit (mol. wt. 840). 59.6% lignin derivative, 37.6% sodium carbonate, 2.6% sodium chloride by analysis.
[3] Degree of substitution estimated about 1.5 sulfobenzyl groups and .4 sodium per building unit (mol. wt. 840). 69.2% sulfobenzyl lignin, 21.4% sodium carbonate and 9.4% sodium chloride.

It will be noted that in manufacturing the sulfobenzyl lignin ether that minor proportions of sodium carbonate and sodium chloride were present in the product, and were present in the above tests. However, as it is well known that neither sodium carbonate, nor salt, nor both, will have any value as a water-loss reducing agent for cement slurries, they are regarded as inert and unessential materials, which may or may not be present as desired, and are not claimed.

It is obvious that inert filling material will not substantially affect the result of this test, when used in an amount not large enough to deleteriously reduce the strength of the cement slurry after setting.

The cement slurry set into a hard cement suitable for use in well cementing and grouting after the water-loss test described above when it contained the effective amount of water-loss reducing additive, but the same cement slurry without the additive set in a cracked and weakened condition after said abovementioned water-loss test due to water lost in said test.

The above example and tests are given for illustrative purposes and should not be regarded as limiting the invention, the scope of which is set forth in the following claims.

Having described my invention, I claim:

1. A cement capable of forming a fluid slurry when mixed with water, said cement comprising a hydraulic cement mixed with from 0.1 to 5% by weight of the dry cement of sodium sulfobenzyl lignin ether which is soluble in the cement slurry.

2. A cement capable of forming a fluid slurry when mixed with water, said cement comprising Portland cement mixed with from 0.1 to 5% by weight of the dry cement of sodium sulfobenzyl lignin ether which is soluble in the cement slurry.

3. A hydraulic cement slurry comprising a hydraulic cement, water, and from 0.1 to 5% by weight of the dry cement of sodium sulfobenzyl lignin ether which is soluble in the cement slurry.

4. A hydraulic cement slurry comprising Portland cement, water, and from 0.1 to 5% by weight of the dry cement of sodium sulfobenzyl lignin ether which is soluble in the cement slurry.

5. A cement capable of forming a fluid slurry when mixed with water, said cement comprising a hydraulic cement mixed with from 0.1 to 5% by weight of the dry cement of one of the group consisting of acid sulfobenzyl lignin ether, acid sulfobenzyl lignin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

6. A cement capable of forming a fluid slurry when mixed with water, said cement comprising Portland cement mixed with from 0.1 to 5% by weight of the dry cement of one of the group consisting of acid sulfobenzyl lignin ether, acid sulfobenzyl lignin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

7. A hydraulic cement slurry comprising a hydraulic cement, water, and from 0.1 to 5% by weight of the dry cement of one of the group consisting of acid sulfobenzyl lignin ether, acid sulfobenzyl lignin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

8. A hydraulic cement slurry comprising Portland cement, water, and from 0.1 to 5% by weight of the dry cement of one of the group consisting of acid sulfobenzyl lignin ether, acid sulfobenzyl lignin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry.

9. A cement capable of forming a fluid slurry when mixed with water, said cement comprising a hydraulic cement mixed with from 0.1 to 5% by weight of the dry cement of alkali metal sulfobenzyl lignin ether which is soluble in the cement slurry.

10. A cement capable of forming a fluid slurry when mixed with water, said cement comprising Portland cement mixed with from 0.1 to 5% by weight of the dry cement of alkali metal sulfobenzyl lignin ether which is soluble in the cement slurry.

11. A hydraulic cement slurry comprising a hydraulic cement, water, and from 0.1 to 5% by weight of the dry cement of alkali metal sulfobenzyl lignin ether which is soluble in the cement slurry.

12. A hydraulic cement slurry comprising Portland cement, water, and from 0.1 to 5% by weight of the dry cement of alkali metal sulfobenzyl lignin ether which is soluble in the cement slurry.

13. The process of producing a hydraulic cement aqueous slurry having a reduced water loss to porous formations which comprises admixing with hydraulic cement from 0.1 per cent to 5 per cent by weight of the dry cement of one of the group consisting of acid sulfobenzyl lignin ether, acid sulfobenzyl lignin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry, and interacting therewith sufficient water to produce a fluid slurry.

14. The process of cementing a well which extends into a porous formation which comprises placing a hydraulic cement aqueous slurry having a reduced water loss adjacent to said porous formation by admixing with hydraulic cement from 0.1 per cent to 5 per cent by weight of the dry cement of one of the group consisting of acid sulfobenzyl lignin ether, acid sulfobenzyl lignin ethers in which at least one of the hydrogen atoms in the alpha $CH_2$ group have been replaced by a radical selected from the group consisting of methyl, ethyl and propyl radicals but in which the alkylene group does not exceed four carbon atoms, and salts of said ethers, which are soluble in the cement slurry, interacting therewith sufficient water to produce a fluid slurry and introducing said slurry into said well into contact with said porous formation.

15. The process of producing a hydraulic cement aqueous slurry having a reduced water loss to porous formations which comprises admixing with hydraulic cement from 0.1 per cent to 5 per cent by weight of the dry cement of sodium sulfobenzyl lignin ether which is soluble in the cement slurry and interacting therewith sufficient water to produce a fluid slurry.

16. The process of cementing a well which extends into a porous formation which comprises placing a hydraulic cement aqueous slurry having a reduced water loss adjacent to said porous formation by admixing with hydraulic cement from 0.1 per cent to 5 per cent by weight of the dry cement of sodium sulfobenzyl lignin ether which is soluble in the cement slurry, interacting therewith sufficient water to produce a fluid slurry and introducing said slurry into said well into contact with said porous formation.

References Cited in the file of this patent

UNITED STATES PATENTS

| Number | Name | Date |
|---|---|---|
| 2,549,507 | Morgan et al. | Apr. 17, 1951 |
| 2,562,148 | Lea et al. | July 24, 1951 |